April 17, 1928.                                    1,666,762
J. L. WOODBRIDGE
SEPARATOR FOR THE ELECTRODES OF ELECTROLYTIC CELLS
Filed July 12, 1927

WITNESS:
Robt R Kitchel

INVENTOR
Joseph Lester Woodbridge
BY
Augustus B Stoughton
ATTORNEY.

Patented Apr. 17, 1928.

1,666,762

UNITED STATES PATENT OFFICE.

JOSEPH LESTER WOODBRIDGE, OF PHILADELPHIA, PENNSYLVAINA.

SEPARATOR FOR THE ELECTRODES OF ELECTROLYTIC CELLS.

Application filed July 12, 1927. Serial No. 205,103.

My invention relates to electrolytic cells and more especially to such cells in which the electrodes consist of intermeshed groups of parallel plates of sheet metal or the like, immersed in a suitable electrolyte.

One object of the invention is to provide simple, inexpensive and durable separators to prevent adjacent plates of opposite polarity from coming into contact. Another object is to provide such separators attached to the plate so that the individual plates may be conveniently handled without danger of the separators becoming displaced. Another object is to provide positive and negative plates which when assembled with their separators will all be identical in design but when intermeshed will bring the separators of adjacent plates into staggered relation.

These and other objects as well as the invention itself, will be more clearly understood by reference to the following description of one embodiment of the invention, reference being made to the accompanying drawing in which—

Figure 1:
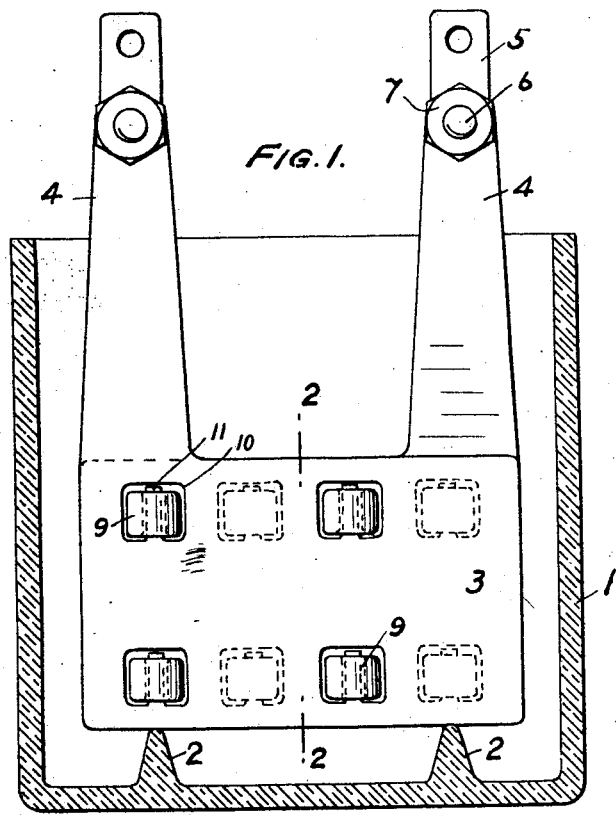
Figure 1 is an elevation, partly in section, of an electrolytic cell embodying features of the invention.
Figure 2:
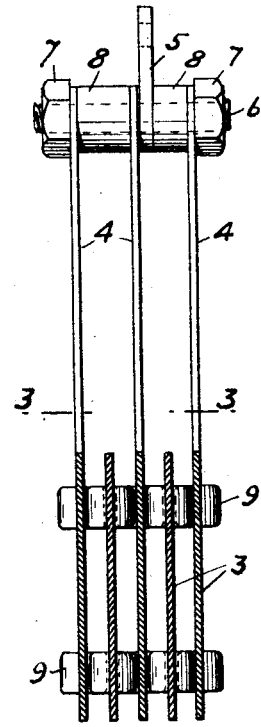
Fig. 2 is a vertical section on the line 2—2 of Figure 1, the container being omitted.
Figure 3:
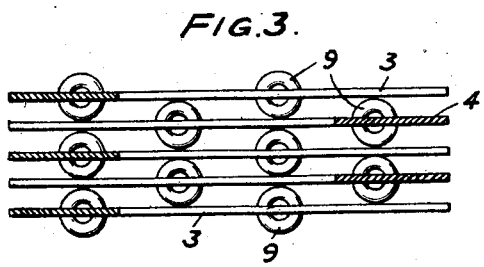
Fig. 3 is a horizontal section on the line 3—3 of Figure 2.

Fig. 1 shows an electrolytic cell which may be a counter electromotive force cell of the nickel-alkaline type. 1 represents the container, preferably of glass, having upstanding ribs 2 on the bottom for supporting the plates 3, which plates may be of sheet nickel or the like. Five such plates are shown (see Figs. 2 and 3), identical in design, each being of rectangular shape with an upstanding terminal lug 4 for making connection to the cell terminal 5. The terminal lugs of three of the plates are bolted together to one cell terminal, while those of the other two plates are similarly bolted to the other cell terminal by means of through bolts 6 with terminal nuts 7. Spacing washers 8 are provided for properly spacing the plate lugs.

Figure 4:
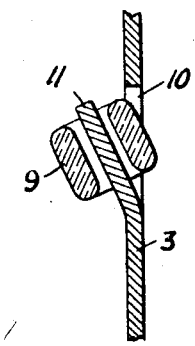
Fig. 4 is a section of a separator and a part of the plate, to an enlarged scale, illustrating the method of assembly.

To prevent adjacent plates of opposite polarity from coming into contact, insulating separators 9 are provided, each separator being in the form of a ring or bead of glass or similar inert material, located in an opening 10 in the plate and retained in position by a tongue, 11, integral with the plate and extending across the opening and threading the hole in the ring or bead. This tongue is attached at one end to or is integral with one edge of the opening but is free at the other end, permitting it to be bent outward as shown in Fig. 4, to permit the bead to be placed over it, whereupon the tongue is straightened into its normal position as in Fig. 2, the tongue being sufficiently rigid to retain the bead whatever may be the position of the plate. The plate with the separator beads thus attached may be subjected to the ordinary handling incident to factory assembly and subsequent transportation without danger of the beads becoming displaced.

The plate shown in full lines in Fig. 1, is provided with four separator beads, two located in vertical alignment under the plate lug and the other two in vertical alignment to the right of the center line of the plate. The next adjacent plate, being of opposite polarity, is reversed in position, so that while the separator beads are identically located with respect to the plate itself, the two sets of beads are in staggered relation, thus providing eight points of separation between the adjacent plates.

After the plates are properly assembled in the container, as shown in Fig. 1, the electrolyte (not shown) will be added to the desired level, covering the plates,

I claim:

1. In combination, an electrode in the form of a metallic sheet, a separator of annular form located in an opening provided in the sheet with its axis substantially in the plane of the sheet, and a tongue attached to the sheet and threading the opening in the separator.

2. In combination, a sheet metal electrode having a perforation, an annular separator located in a perforation, and a tongue extending across the perforation and threading the separator, said tongue attached at one end to the sheet and free at the other end and adapted to be bent out of the plane of the sheet to receive the separator and to be bent back to retain the separator in the perforation.

3. In combination two sheet electrodes each provided with annular separators, each separator mounted in an opening provided in the sheet, each opening having a tongue projecting from the sheet across the opening and threading the separator, the separators being so identically located in each sheet that when the sheets are in reversed confronting relation, the separators are in staggered relation.

4. A metallic sheet electrode having an opening of which one wall is equipped with a tongue providing space between its side walls and the confronting walls of the opening and having an insulating body mounted on said tongue and arranged in said space and projecting beyond the faces of the plate, said structure being transportable as a unit.

5. A series of duplicate metallic sheet electrodes having lugs disposed alternately at opposite sides of the series and each having insulating bodies disposed some generally in line with the lug and others beyond the median line of the plate, said bodies mounted on tongues and in openings provided in the plate and extending beyond the plate faces, whereby the separators of adjacent plates are disposed in staggered relation.

JOSEPH LESTER WOODBRIDGE.